(12) United States Patent
Kikawa et al.

(10) Patent No.: US 7,216,535 B2
(45) Date of Patent: *May 15, 2007

(54) AIR FLOW MEASURING DEVICE AND ENGINE HAVING THE AIR FLOW MEASURING DEVICE

(75) Inventors: Hiromu Kikawa, Hitachinaka (JP);
Izumi Watanabe, Hitachinaka (JP);
Shinya Igarashi, Naka-machi (JP);
Keiichi Nakada, Hitachinaka (JP); Kei Ueyama, Hitachinaka (JP)

(73) Assignees: Hitachi, Ltd., Tokyo (JP); Hitachi car Engineering Co., Ltd., Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/451,468

(22) Filed: Jun. 13, 2006

(65) Prior Publication Data
US 2006/0225497 A1    Oct. 12, 2006

Related U.S. Application Data

(63) Continuation of application No. 09/858,476, filed on May 17, 2001, now Pat. No. 7,059,183.

(30) Foreign Application Priority Data
Jun. 16, 2000   (JP)   ............................. 2000-185907

(51) Int. Cl.
*G01F 1/68*   (2006.01)
(52) U.S. Cl. .................. 73/202.5; 73/118.2; 73/204.21

(58) Field of Classification Search ..................... None
See application file for complete search history.

(56) References Cited

U.S. PATENT DOCUMENTS

| | | | |
|---|---|---|---|
| 4,494,405 A | 1/1985 | Oosuga et al. | |
| 4,709,581 A | 12/1987 | Nishimura et al. | |
| 5,127,173 A | 7/1992 | Thurston et al. | |
| 5,355,726 A | 10/1994 | Zurek et al. | |
| 5,696,321 A | 12/1997 | Igarashi et al. | |
| 6,332,356 B1 | 12/2001 | Hecht et al. | |
| 6,336,360 B1 | 1/2002 | Weber | |
| 6,571,621 B2 * | 6/2003 | Watanabe et al. | 73/202.5 |
| 6,647,775 B1 | 11/2003 | Hecht et al. | |
| 6,694,810 B2 * | 2/2004 | Ueyama et al. | 73/204.22 |
| 2001/0052260 A1 * | 12/2001 | Kikawa et al. | 73/202 |
| 2002/0116995 A1 * | 8/2002 | Watanabe et al. | 73/202.5 |
| 2004/0182171 A1 * | 9/2004 | Igarashi et al. | 73/861 |
| 2005/0204810 A1 * | 9/2005 | Kikawa et al. | 73/202 |

FOREIGN PATENT DOCUMENTS

| | | |
|---|---|---|
| DE | 19800573 | 7/1999 |
| DE | 198 15 654 A1 | 10/1999 |

(Continued)

*Primary Examiner*—Harshad Patel
(74) *Attorney, Agent, or Firm*—Dickstein Shapiro LLP

(57) ABSTRACT

The present invention provides an air flow measuring device comprising a housing with a sub-passage having a inlet and a outlet for air flow formed in the housing, the sub-passage further having a predefined curvature with a maximum downstream point and a flow measuring element located in the sub-passage at a position at least further downstream from the point.

34 Claims, 7 Drawing Sheets

FOREIGN PATENT DOCUMENTS

| | | |
|---|---|---|
| DE | 198 15 656 A1 | 10/1999 |
| GB | 2293884 | 4/1996 |
| JP | 56-53411 | 5/1981 |
| JP | 11-248505 | 9/1999 |
| WO | WO 99-53274 | 10/1999 |

* cited by examiner

AIR FLOW MEASURING DEVICE AND ENGINE HAVING THE AIR FLOW MEASURING DEVICE

CROSS REFERENCE TO RELATED APPLICATIONS

This application is a continuation of application Ser. No. 09/858,476, filed on May 17, 2001, now U.S. Pat. No. 7,059,183 which is hereby incorporated by reference in its entirety.

FIELD OF THE INVENTION

The present invention relates to air flow measuring devices, and particularly, to air flow measuring devices for internal combustion engines.

DISCUSSION OF THE RELATED ART

Conventional air flow measuring devices for internal combustion devices are provided with a filter element for cleaning the incoming air. However, its cleaning effect is inadequate since the dust particles or moisture contained in the intake air, often passes through the filter element reaching the air intake passage, where the air flow measuring device is located. Also, certain after market air filter products are poorer in quality as compared to the original product which further exasperates the problem. If the dust particles contained in the intake air adheres to the flow measuring element of the air flow measuring device, the characteristic heat radiation which is utilized to accurately measure the air flow can deviate, outputting inaccurate results. Also, depending on the dust particle size and speed of the particle in the incoming air flow, the flow measuring element may even be damaged. Further, if moisture, such as water, adheres to the measuring element, the element may deteriorate with time due to sudden temperature changes or provide an inaccurate output due to changes in the heat radiation rate.

SUMMARY OF THE INVENTION

The present invention provides a sub-passage that allows dust or moisture contained in the intake air, which may provide inaccurate readings by an air flow measuring element, due to contamination or break-down, to be separated by inertial force of the dust or moisture while ensuring a sufficient air flow in the area where the flow measuring element is installed.

In an object of the invention, an air flow measuring device comprising a housing with a sub-passage having a inlet and a outlet for air flow formed in the housing is provided. The sub-passage has a predefined curvature with a maximum downstream point. Also, a flow measuring element is located in the sub-passage at a position at least further downstream from the point.

In another object of the invention, a engine comprising a engine control unit and an air flow measuring device electrically coupled to the engine control unit for measuring air flow is provided. The air flow measuring device comprises a housing with a sub-passage having a inlet and a outlet for air flow is formed in the housing. The sub-passage has a predefined curvature with a maximum downstream point. Also, a flow measuring element located in the sub-passage at a position at least further downstream from said point.

In yet another object of the invention, an air flow measuring device comprising a housing and a sub-passage formed in the housing is provided. The sub-passage has a predefined curvature with a maximum downstream point and a flow measuring element located in the sub-passage at a position at least further downstream from the point.

BRIEF DESCRIPTION OF THE DRAWINGS

The above advantages and features of the invention will be more clearly understood from the following detailed description which is provided in connection with the accompanying drawings.

FIGS. 3-1 through 3-4 illustrates cross-sectional views of the sub-passages in the structures shown in FIGS. 1 and 2;

FIG. 4 illustrates a cross-sectional view of a modified version of the sub-passage structure shown in FIG. 2;

DETAILED DESCRIPTION OF THE INVENTION

Figure 1:
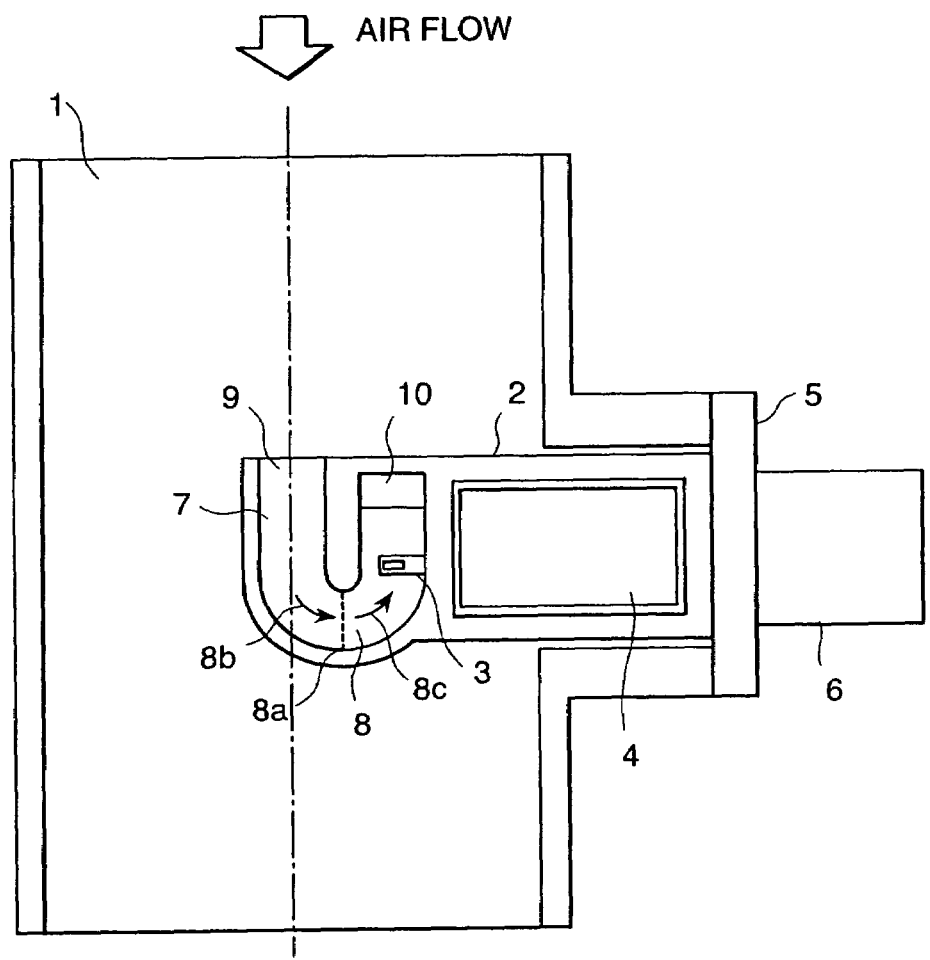
FIG. 1 illustrates a cross-sectional view of a air flow measuring device according to one embodiment of the present invention.

Exemplary embodiment of the present invention will be described below in connection with the drawings. Other embodiments may be utilized and structural or logical changes may be made without departing from the spirit or scope of the present invention. Although the invention is described in terms of an automobile component, namely, an automobile engine, the invention is applicable to other combustion engines utilizing an air flow measuring device. Like items are referred to by like reference numerals throughout the drawings.

Figure 3:
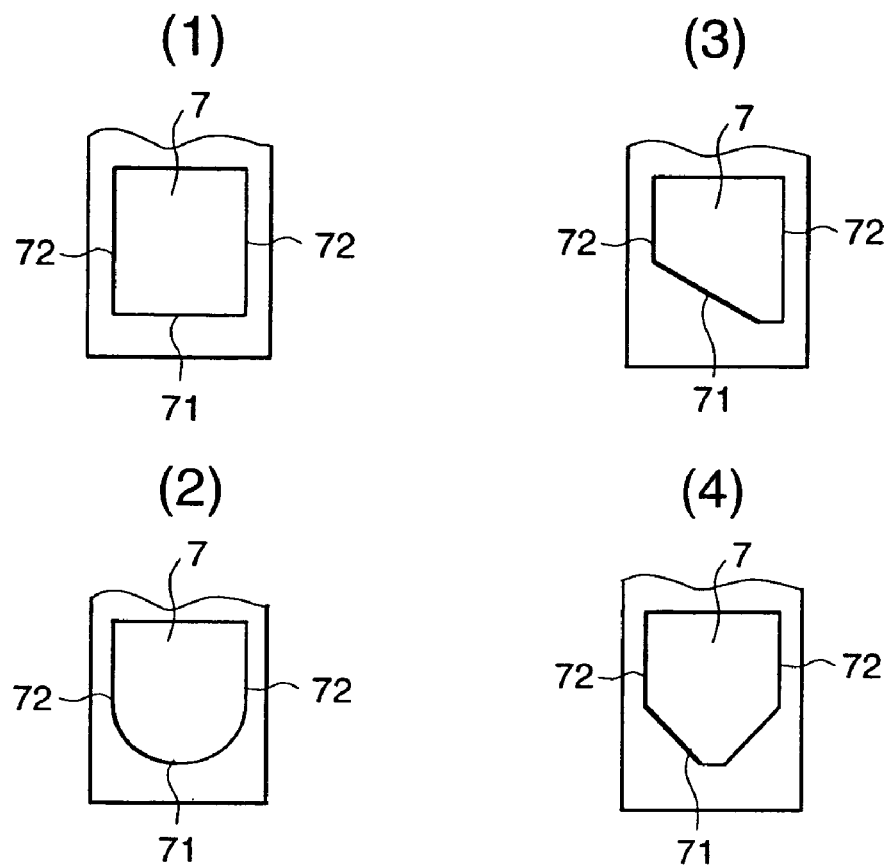

Referring now to the drawings, FIG. 1 illustrates a cross-sectional view of an air flow measuring device of the present invention. The air flow measuring device is preferably a heating resistor type. In an air intake passage 1 of an automobile internal combustion engine, a module housing 2 for a heating resistor type air flow measuring device is installed through a module flange 5. A sub-passage 7 is formed at the end of the module housing 2 and a flow measuring element 3 is installed inside the sub-passage 7. The flow measuring element 3 is electrically connected with an electronic circuit 4 installed in the module housing 2 and the electronic circuit 4 is electrically connected with the outside through a connector 6. The sub-passage 7 contains a sub-passage inlet 9 whose opening face is perpendicular to the air flow into the air intake passage 1 and a sub-passage outlet 10 whose opening face is parallel to the air flow into the air intake passage 1. In other words, the direction of the air flow is inline with the inlet 9 and the air flow exits outlet 10 in a direction which is perpendicular to the entering air flow. Sub-passage 7 has a semi-circular bottom bend 8 with a predefined curved surface and the flow measuring element 3 is located on the downstream side of the bend of the sub-passage 7. Bottom bend 8 has a maximum downstream point 8*a* (show in Fig) at or near the apex of the curvature. Hence, air flow enters inlet 9 and travels in a direction upstream 8*b* (show in Fig) to the maximum downstream point 8*a* and travels in a direction downstream 8*c* (show in Fig) toward outlet 10. Hence, dust particles or other foreign matter which has entered sub-passage 7 travels along the outer wall surface 71 (as shown in FIG. 3) at the sub-passage bottom bend 8 by inertial force based on the velocity and weight of the dust particle or foreign matter. Thus, the dust particles or other foreign matter does not interfere with the flow measuring element 3 located around the maximum downstream point 8*a* of the sub-passage bottom bend 8 and is discharged to the air intake passage 1 through the sub-passage outlet 10.

Figure 2:
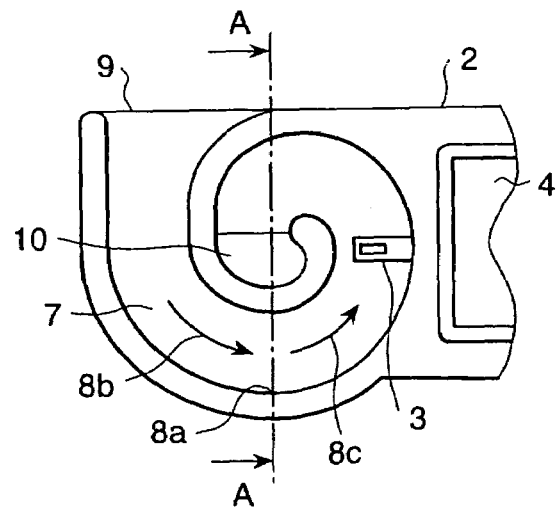
FIG. 2 illustrates a cross-sectional view of a sub-passage according to one embodiment of the present invention.

FIG. 2 is a cross-sectional view of a sub-passage structure in another embodiment of the present invention. Sub-passage 7 has a predefined curvature which continues to curve to outlet 10 beyond the flow measuring element 3. In other words, the flow measuring element 3 is located in a direction downstream 8*c* from the maximum downstream point 8*a* as described in FIG. 1. The opening face of the sub-passage inlet 9 is perpendicular to the air flow into the air intake passage 1 and the sub-passage outlet 10 has its opening face in a plane parallel to the direction of the air flow. Hence, dust particles or other foreign matter which has entered the sub-passage 7 goes along the outer wall 71 (as shown in FIG. 3) of the sub-passage 7 by inertial force based on its own velocity and weight. In this way, it does not collide against the flow measuring element 3 located in a direction downstream 8*c* from the maximum downstream point 8*a* of the sub-passage and is discharged into the air intake passage 1 through the sub-passage outlet 10. In this embodiment, the sub-passage 7 is continuously curved to the outlet 10 so that vortex formation which may occur on the downstream side of the inner wall area of the sub-passage bend can be effectively suppressed, allowing the heating resistor type air flow measuring element 3 to provide a stable output with less noise. Also, in this structure, the position of the sub-passage outlet 10 can be altered without changing the size of the entire sub-passage, which means that the relative distance between the sub-passage inlet 9 and the sub-passage outlet 10 can be changed. The relative distance between the sub-passage inlet 9 and outlet 10 is an important factor that determines the effect of inertia given throughout the sub-passage 7. By changing the distance freely, the effect of the air flow in the air flow measuring device can be more easily controlled.

Figure 4:
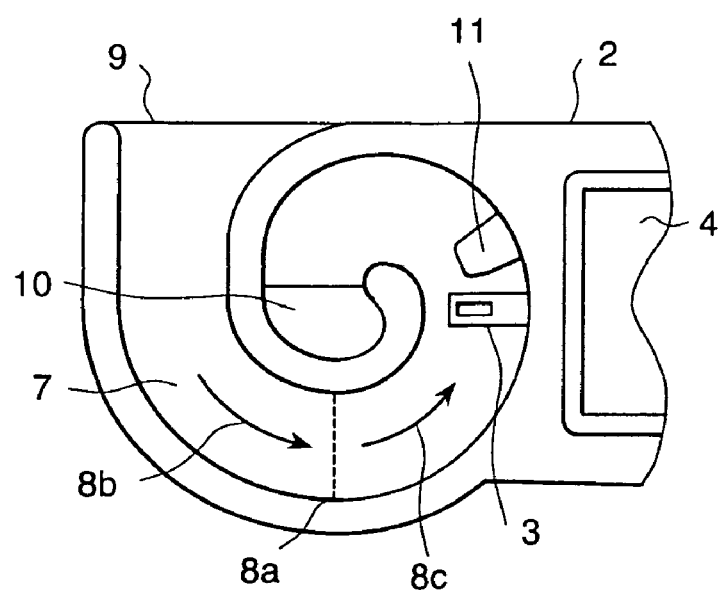

FIGS. 3-1 through 3-4 illustrate cross-sectional views of the sub-passage 7 shown in FIGS. 1 and 2, in particular, cross-section "A—A" of FIG. 2. In FIG. 3-1, foreign matter that has entered the sub-passage 7 collides against the outer wall surface 71 of the sub-passage 7. In this example, the outer wall surface 71 is completely flat and the foreign matter which has collided against the wall surface 71 may rebound toward the center of the sub-passage 7 again. In other words, outer wall 71 does not provide a means for guiding and gathering the dust particles or foreign matter. Rather, foreign matter repeatedly rebounds and collides against outer wall 71 while gradually moving along the outer wall surface 71 of the sub-passage 7 to outlet 10. In contrast, the outer wall surface 71 of FIGS. 3-2 through 3-4 are grooved to effectively gather and guide foreign matter to outlet 10. FIG. 3-2 shows an example in which the outer wall surface 71 of the sub-passage is grooved to be semicircular. FIG. 3-3 shows an example in which one side of a junction between the sub-passage outer wall surface 71 and the sub-passage side wall surfaces 72 is grooved. FIG. 3-4 shows an example where both sides of the junction between the sub-passage outer wall surface 71 and the sub-passage side wall surfaces 72 are grooved. In all these structures, based on the angle of the walls 71, 72, dust or other foreign matter that has collided against the sub-passage outer wall surfaces 71, 72 rebounds toward the groove of the sub-passage 7, which permits the foreign matter to be more effectively gathered and guided toward the sub-passage outlet 10. Also, the groove allows dust particles or other foreign matter collected in the outer wall surface 71 to be effectively discharged through the air vent 11 into the air intake passage 1 without interfering with the flow measuring element 3 which is located, at least above the groove, which reduces the deterioration, break-down or other damage to the flow measuring element 3.

FIG. 4 illustrates a cross-sectional view of a modified version of the sub-passage structure as shown in FIG. 2. Here, an air vent 11 with an opening surface area of less than about fifty percent of the opening surface area of the sub-passage outlet 10 is provided on the sub-passage side wall surface 72, downstream 8*c* from the flow measuring element 3. By regulating the opening of the air vent 11, the inertial effect of the sub-passage 7 can be effectively controlled. Another advantage of this structure is air vent 11 allows any water trapped in sub-passage 7 to be effectively forced out of it, even if the air in it is still.

Figure 5:
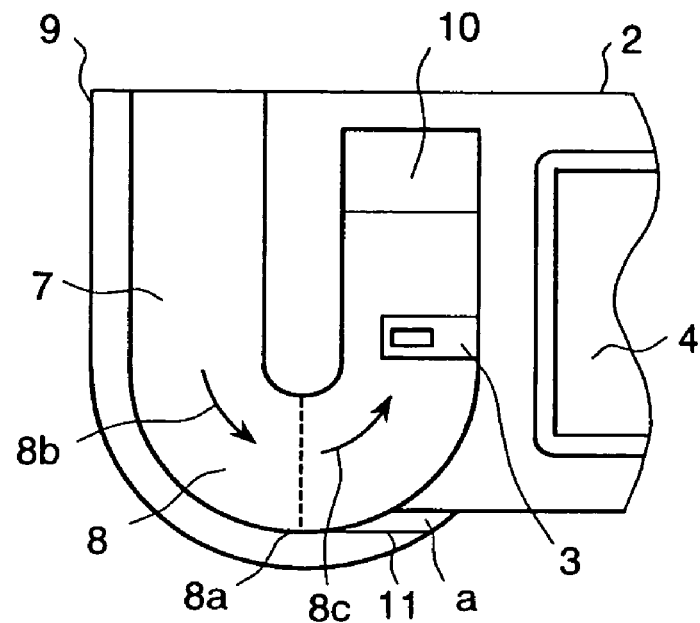
FIG. 5 illustrates a cross-sectional view of a modified version of the sub-passage structure shown in FIG. 1.
Figure 6:
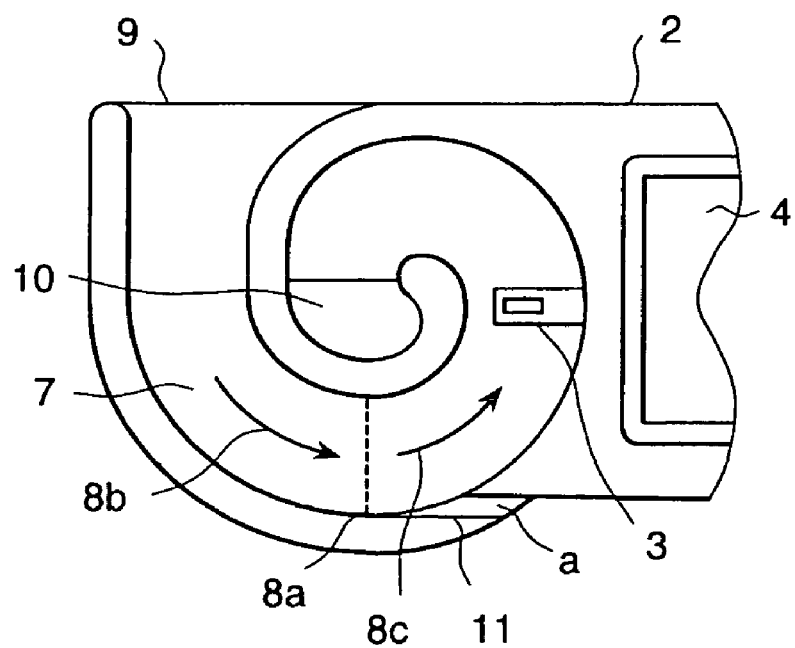
FIG. 6 illustrates a cross-sectional view of a modified version of the sub-passage structure shown in FIG. 2.

FIGS. 5 and 6 are cross-sectional views of another embodiment of the sub-passage structures as shown in FIGS. 1 and 2, respectively. In both structures, an air vent 11 with a height "a" of about 1 mm is provided in a direction upstream 8*b* from the flow measuring element 3 in sub-passage 7. In these structures, when the ratio of the opening surface area of the air vent 11 to that of the sectional surface area (at its widest point) of subpassage 7 is less than 1:10, it is possible to effectively discharge foreign matter as mentioned above, without impairing the performance of the sub-passage 7. Further, an air vent 11 of this embodiment is effective in eliminating moisture which may collect inside the sub-passage 7.

Figure 7:
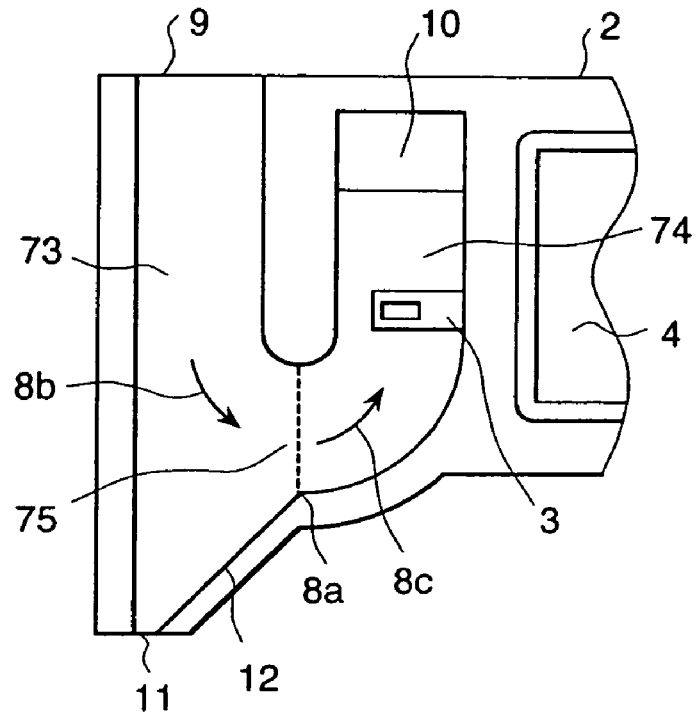
FIG. 7 illustrates a cross-sectional view of a modified version of the sub-passage structure shown in FIG. 1.

FIG. 7 illustrates a cross-sectional view of a modified version of the sub-passage structure as shown in FIG. 1. The sub-passage 7 has a sub-passage inlet 9 with an opening face which is perpendicular to the air flow in the air intake passage 1 and a sub-passage outlet 10 with an opening face parallel to the air flow in the air intake passage 1. Sub-passage 7 has a semi-circular bottom bend 8 with a predefined curved surface and the flow measuring element 3 is located on the downstream side of the bend of the sub-passage 7. Bottom bend 8 has a maximum downstream point 8*a* (show in Fig) at or near the apex of the curvature. Hence, air flow enters inlet 9 and travels in a direction upstream 8*b* (show in Fig) to the maximum downstream point 8*a* and travels in a direction downstream 8*c* (show in Fig) toward outlet 10. Hence, since dust particles or other foreign matter which has entered the sub-passage 7 travels along the outer wall surface 71 (as shown in FIG. 3) at the sub-passage bottom bend 8 by inertial force based on the velocity and weight of the dust particle or foreign matter, it does not interfere with the flow measuring element 3 located downstream from the maximum downstream point 8a of the sub-passage bottom bend 8 and is discharged to the air intake passage 1 through the sub-passage outlet 10.

In sub-passage 1, at a location at least upstream from the maximum downstream point 8a, there is a first vertical path bottom inclination 12 with a given angle from the plane of air flow from the sub-passage inlet 9. Preferably, an air vent 11 is provided at the base of the inclination 12. In this embodiment, dust particles or other foreign matter which has entered the sub-passage 7 will tend to go straight down the first vertical path 73 by its own weight and velocity toward the first vertical path bottom inclination 12. Also, the dust particles or other foreign matter exits sub-passage 7 by air vent 11. Therefore, air flow, free of debris or moisture can flow in the first horizontal path 75, then downstream towards the second vertical path 74 and exits at outlet 10.

Figure 8:
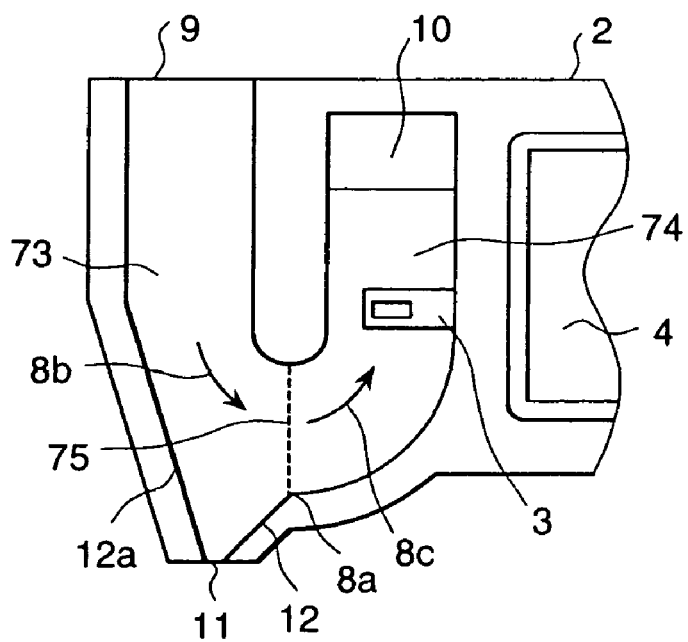
FIG. 8 illustrates a cross-sectional view of a modified version of the sub-passage structure shown in FIG. 1.

FIG. 8 illustrates a cross-sectional view of a modified version of the sub-passage structure as shown in FIG. 1. Here, a second vertical path bottom inclination 12a (show in Fig) is provided opposite to that of the first inclination 12. The second inclination 12a is also provided upstream from the maximum downstream point 8a. This design is suited to sub-passages which has a first vertical path 73, smaller than the one described in FIG. 7.

Figure 9:
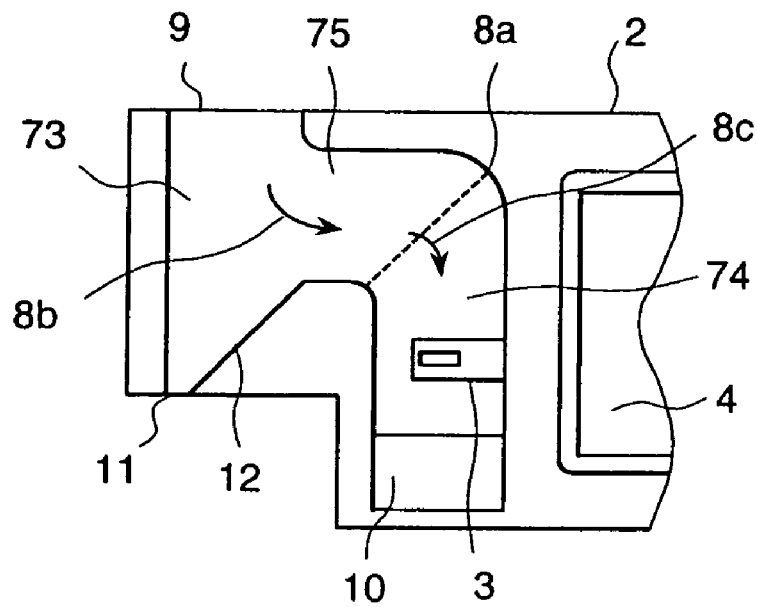
FIG. 9 illustrates a cross-sectional view of a modified version of the sub-passage structure shown in FIG. 1.
Figure 10:
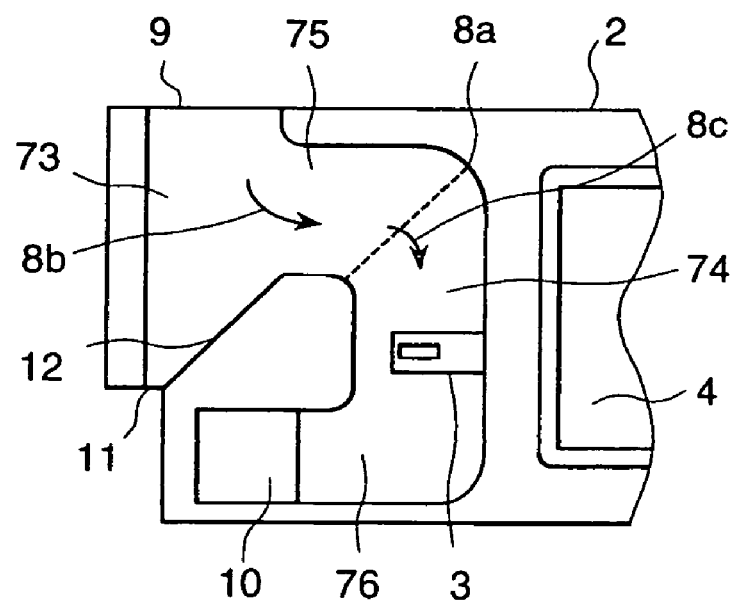
FIG. 10 illustrates a cross-sectional view of a modified version of the sub-passage structure shown in FIG. 1.

FIGS. 9 and 10 show other embodiments, as modified versions of the embodiment shown in FIG. 7. Note, in both these embodiments, the air flow measuring element 3 is also provided downstream from the maximum downstream point 8a (show in Fig.). Also, in the embodiment as described in FIG. 10, a second horizontal path 76 is shown. These embodiments produce substantially the same effect on dust particles and other foreign matter entering the sub-passage 7 as the one described in FIG. 7.

Figure 11:
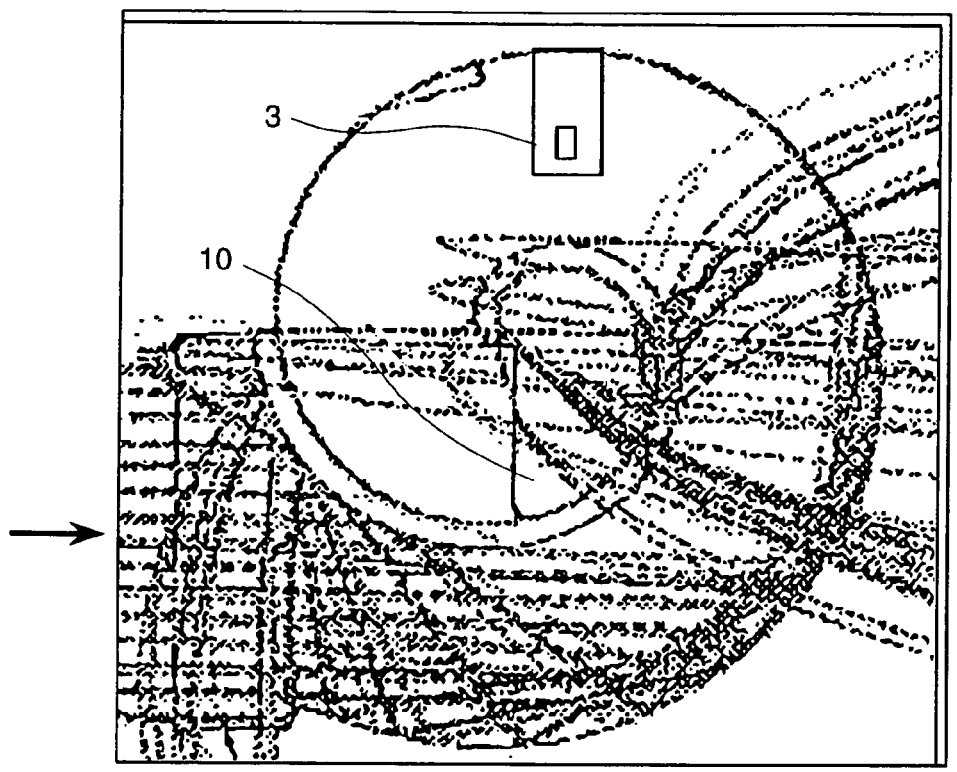
FIG. 11 illustrates the result of a CAE calculation utilizing the air flow measuring device of the present invention.

FIG. 11 illustrates the result of Computer Aided Engineering (CAE) calculation which was carried out utilizing the air flow measuring device of the present invention. Here, the solid lines represent passage wall surfaces and the dotted lines represent tracks of dust particles or foreign matter in the air. The figure demonstrates that dust coming in through the sub-passage inlet 9 collides against the outer wall surface 71 of the sub-passage 7 and rebounds from it repeatedly, while gradually moving along the outer wall surface 71. In other words, dust particles or foreign matter is concentrated and guided near the outer wall surface 71 and exits outlet 10 with little influence on the measuring element 3.

Figure 12:
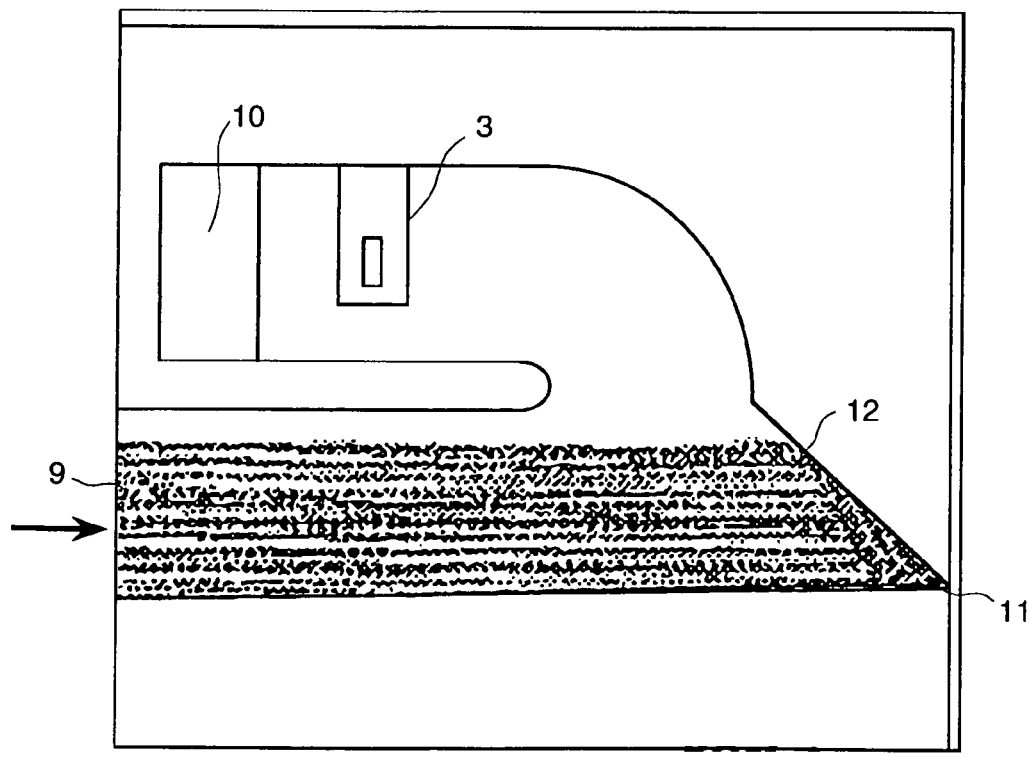
FIG. 12 illustrates the result of another CAE calculation utilizing the air flow measuring device of the present invention.

FIG. 12 illustrates the result of another CAE of another embodiment of the present invention. Here, the solid lines represent passage wall surfaces and the dotted lines represent tracks of dust in the air. Dust coming in through the sub-passage inlet 9 goes straight and collides against the first vertical path bottom inclination 12. Then the dust rebounds toward the air vent 11 due to the inclination angle and is forced out of the sub-passage 7. In other words, dust particles or foreign matter is concentrated and guided near the outer wall surface 71 and exits air vent 11 with little influence on the measuring element 3 while the air flow exits outlet 10.

Hence, the present invention provides an air flow measuring device comprising a housing with a sub-passage having a inlet and a outlet for air flow formed in the housing. The sub-passage has a predefined curvature with a maximum downstream point. Also, a flow measuring element is located in the sub-passage at a position at least further downstream from the point.

Figure 13:
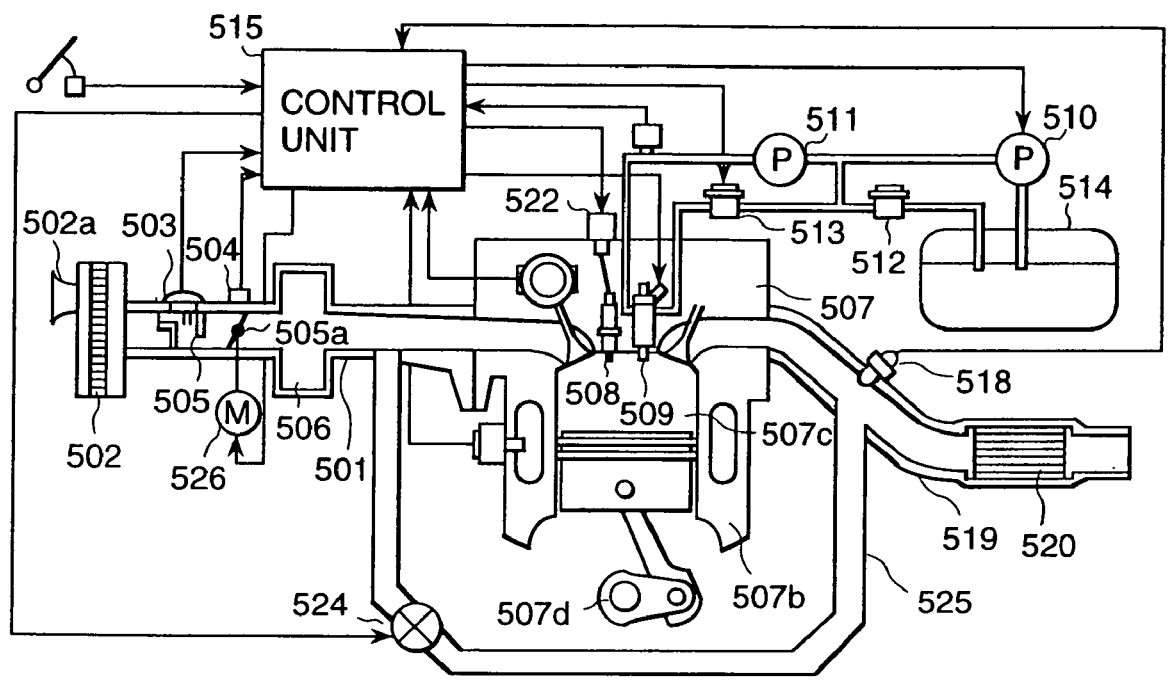
FIG. 13 illustrates a internal combustion engine of utilizing the air flow measuring device of the present invention.

FIG. 13 illustrates an example of an internal combustion engine 507 utilizing the air flow measuring device as described in FIGS. 1–12 of the present invention. Although a specific engine type is described, the present invention can be utilized in any internal combustion engine. Air introduced into a combustion chamber 507c of the engine 507 is a combination of an air intake and EGR gas, wherein the air intake is let in by way of an inlet part 502a of an air cleaner 502 and passes through an air flow measuring device 503 of the present invention, which is one of the means for measuring the operating state of the engine 507. The air further passes through a throttle body 505 in which an electrically controlled throttle valve 505a for controlling the air intake flow quantity is housed. The electrically controlled throttle valve 505a is driven by an electrically controlled throttle motor 526. Next, the air enters a collector 506. From the air flow sensor 503, a signal representing the air intake flow quantity is outputted to a control unit 515, for example, a engine control unit.

A throttle sensor 504, which detects the aperture of the electrically controlled throttle valve for measuring the operating state of the engine, is fitted to the throttle body 505 and its signal is also outputted to the control unit 515. Between an air intake pipe 501 and an exhaust pipe 519, a bypass pipe 525 is provided to constitute bypass piping for recirculating exhaust gas and bypass pipe 525 is provided with an electrically controlled type EGR valve 524, for controlling the recirculating flow quantity of exhaust gas. The air suctioned into the collector 506, after being distributed to air intake pipes 501, each connected to one or another of cylinders 507b of the engine 507, joins EGR gas and is guided to a combustion chamber 507c in each cylinder 507b.

Fuel, such as gasoline, from a fuel tank 514 undergoes primary pressurization by a fuel pump 510, then undergoes secondary pressurization by another fuel pump 511 to a higher pressure while being regulated by a fuel pressure regulator 512 to a constant pressure. The fuel is subjected to another constant pressure by another fuel pressure regulator 513 and injected from injectors 509, one of which is provided for in each cylinder, into combustion chambers 507c. Fuel injected into combustion chambers 507c is raised in voltage by ignition coils 522 and ignited by ignition plugs 508 in response to an ignition signal.

Additionally, a crank angle sensor fitted to a crankshaft 507d of the engine 507 outputs an angle signal POS for detecting a revolution signal, indicating the rotational position of the crankshaft 507d, to the control unit 515. A catalytic converter 520 is provided midway on each exhaust pipe 519 and an A/F sensor 518 provided upstream from the catalytic converter 520 detects the contents of exhausted gas, the resultant detection signal being outputted to the control unit 515.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. An air flow measuring device comprising:
    a housing;
    a sub-passage with an inlet and an outlet for air flow formed in said housing, said sub-passage having a predefined curvature with a maximum downstream point; and a flow measuring element located in said sub-passage at a position at least further downstream from said point.

2. The device of claim 1 wherein said outlet has an opening face in a plane parallel to said air flow into said inlet.

3. The device of claim 1 further comprising an air vent located downstream from said flow measuring element, said air vent having an opening surface area of less than about fifty percent of a surface area of said outlet.

4. The device of claim 1 further comprising an air vent located upstream from said flow measuring.

5. The device of claim 4 wherein said air vent has a height of about 1 mm.

6. The device of claim 4 wherein said air vent has an opening surface area ratio of less than about 1:10 compared to a sectional surface area of said sub-passage.

7. The device of claim 1 wherein said sub-passage further comprises an outer wall, said outer wall having a predefined groove for collecting unwanted matter in said air flow.

8. The device of claim 7 wherein said flow measuring element is located at a position at least above said groove.

9. The device of claim 1 wherein said device is located in an air intake passage of an internal combustion engine.

10. The device of claim 1 wherein said flow measuring element is coupled to an electronic circuit for processing data received from said element.

11. The device of claim 1 wherein said sub-passage further comprises an inclination of the outer wall at least before said point.

12. The device of claim 11 further comprising an air vent positioned at the base of said inclination.

13. An engine comprising:
an engine control unit;
an air flow measuring device electrically coupled to said engine control unit for measuring air flow, said device comprising:
a housing;
a sub-passage with an inlet and an outlet for air flow formed in said housing, said sub-passage having a predefined curvature with a maximum downstream point; and
a flow measuring element located in said sub-passage at a position at least further downstream from said point.

14. The engine of claim 13 wherein said outlet has an opening face in a plane parallel to said air flow into said inlet.

15. The engine of claim 13 further comprising an air vent located downstream from said flow measuring element, said air vent having an opening surface area of less than about fifty percent of a surface area of said outlet.

16. The engine of claim 13 further comprising an air vent located upstream from said flow measuring element.

17. The engine of claim 16 wherein said air vent has a height of about 1 mm.

18. The engine of claim 16 wherein said air vent has an opening surface area ratio of less than about 1:10 compared to a sectional surface area of said sub-passage.

19. The engine of claim 13 wherein said sub-passage further comprises an outer wall, said outer wall having a predefined groove for collecting unwanted matter in said air flow.

20. The engine of claim 19 wherein said flow measuring element is. located at a position at least above said groove.

21. The engine of claim 13 wherein said sub-passage further comprises an inclination of the outer wall at least before said point.

22. The engine of claim 21 further comprising an air vent positioned at the base of said inclination.

23. An air flow measuring device comprising:
a housing and a sub-passage formed in said housing, said sub-passage having a predefined curvature with a maximum downstream point and a flow measuring element located in said sub-passage at a position at least further downstream from said point.

24. The device of claim 23 wherein said sub-passage further comprises an inlet and an outlet for air flow, said outlet having an opening face in a plane parallel to said air flow into said inlet.

25. The device of claim 24 further comprising an air vent located downstream from said flow measuring element, said air vent having an opening surface area of less than about fifty percent of a surface area of said outlet.

26. The device of claim 23 further comprising an air vent located upstream from said flow measuring element.

27. The device of claim 26 wherein said air vent has a height of about 1 mm.

28. The device of claim 26 wherein said air vent has an opening surface area ratio of less than about 1:10 compared to a sectional surface area of said sub-passage.

29. The device of claim 23 wherein said sub-passage further comprises an outer wall, said outer wall having a predefined groove for collecting unwanted matter in said air flow.

30. The device of claim 29 wherein said flow measuring element is located at a position at least above said groove.

31. The device of claim 23 wherein said device is located in an air intake passage of an internal combustion engine.

32. The device of claim 23 wherein said flow measuring element is coupled to an electronic circuit for processing data received from said element.

33. The device of claim 23 wherein said sub-passage further comprises an inclination of the outer wall at least before said point.

34. The device of claim 33 further comprising an air vent positioned at the base of said inclination.

* * * * *